Figure 1:
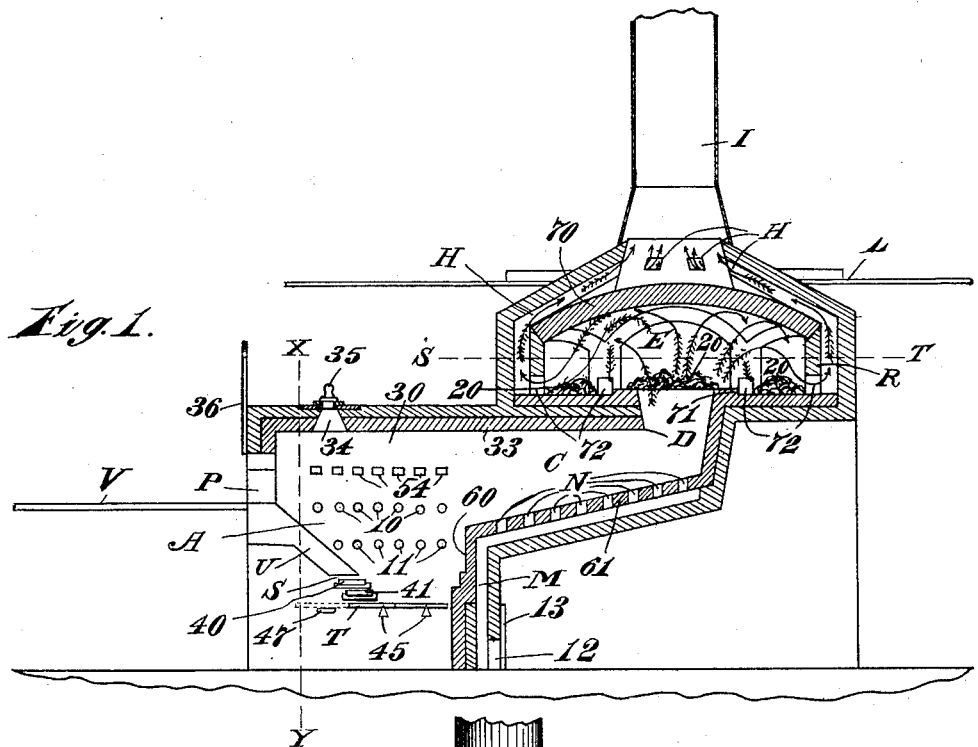

H. RAGOT.
REFUSE BURNER.
APPLICATION FILED OCT. 12, 1912.

1,113,829.

Patented Oct. 13, 1914.
4 SHEETS—SHEET 1.

WITNESSES:

INVENTOR.
Henry Ragot
BY
ATTORNEY.

H. RAGOT.
REFUSE BURNER.
APPLICATION FILED OCT. 12, 1912.
1,113,829.
Patented Oct. 13, 1914.
4 SHEETS—SHEET 2.
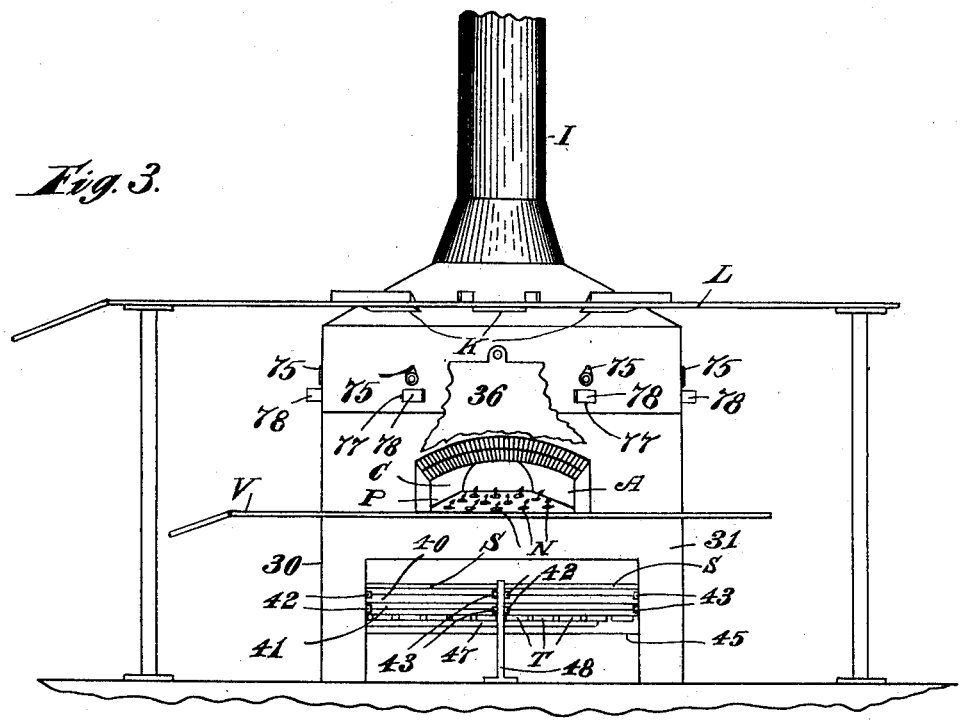
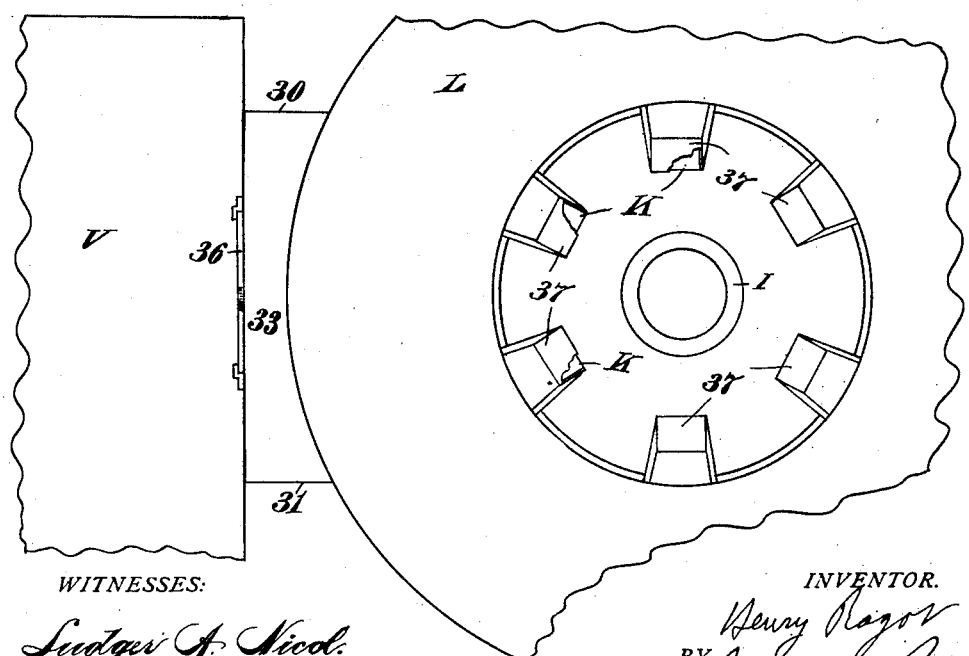

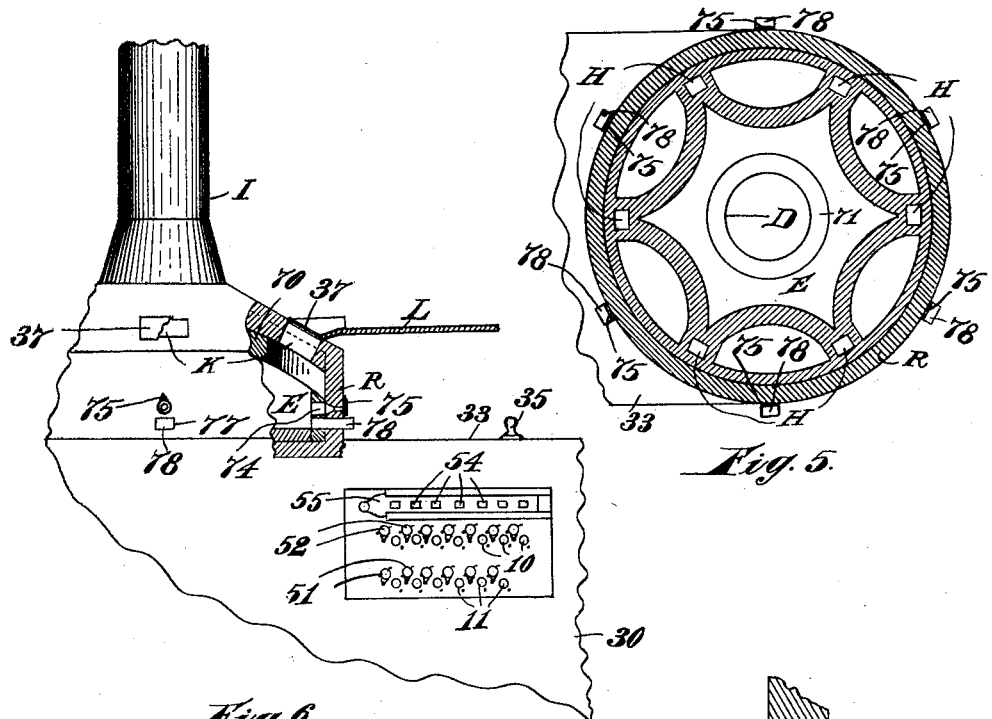
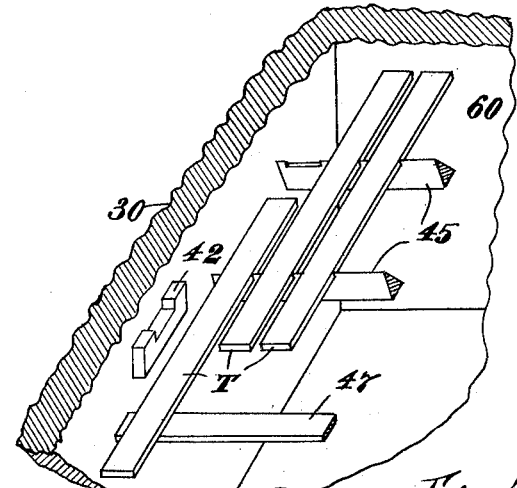
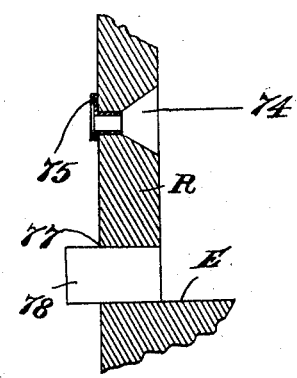

H. RAGOT.
REFUSE BURNER.
APPLICATION FILED OCT. 12, 1912.

1,113,829.

Patented Oct. 13, 1914.
4 SHEETS—SHEET 4.

WITNESSES:

INVENTOR.
Henry Ragot
BY
ATTORNEY.

UNITED STATES PATENT OFFICE.

HENRY RAGOT, OF LAWRENCE, MASSACHUSETTS, ASSIGNOR OF ONE-HALF TO DEMAREST LLOYD, OF BOSTON, MASSACHUSETTS.

REFUSE-BURNER.

1,113,829. Specification of Letters Patent. Patented Oct. 13, 1914.

Application filed October 12, 1912. Serial No. 725,440.

*To all whom it may concern:*

Be it known that I, HENRY RAGOT, a citizen of the United States, residing at Lawrence, in the county of Essex and State of Massachusetts, have invented certain new and useful Improvements in Refuse-Burners, of which the following is a specification.

My invention relates to furnaces and to the burning of materials where an intense heat and complete combustion is desirable. It can be used as a furnace or fire place for many purposes but it is peculiarly adapted for the destruction of waste material from stores, factories, tanneries and houses such as decomposed vegetable matter of any kind, decayed fruit, offal, dead animals and particularly garbage. By my method and by my device, such waste material is desiccated, carbonized and burned from the top or outside downward or inward whereby no odor is permitted to escape therefrom.

My device is preferably so constructed that dry combustible waste material such as paper, excelsior, etc., can be used as fuel to provide heat for the destruction of wet waste material such as garbage as well as for its own consumption.

Devices for carrying out my invention comprise two connected furnaces of which one is above, at some distance from and preferably not directly over the other. The flue from the lower enters the upper and the oxidizing flame and products of combustion from the lower pass into the upper at an intense heat. The upper furnace is so constructed that the wet material rests on the floor thereof and the heat, blaze and flame from the lower furnace are so directed as to completely envelop it.

As wet waste material such as garbage is apt to have a bad smell, it is desirable to expel the water and to burn it in such a way that the smell will not be carried out with the smoke or steam to the annoyance of residents of the neighborhood. This I accomplish by placing the wet waste or garbage in a secondary furnace and by directing upon it an oxidizing flame of intense heat, say 2,400 degrees. By so doing, the moisture therein instead of being slowly evaporated is almost instantly converted into superheated steam. As superheated steam has no odor, there is no odor leaving the incinerator with the steam. After the moisture is expelled or while it is being expelled, the inflammable gases, if any, are also expelled and burned leaving the residue from the garbage in a carbonized condition.

As I introduce an excess of air into the flame before it reaches the wet waste, any inflammable gases therefrom immediately burn and the carbonized residue also rapidly burns. As all this takes place in the intensely heated secondary furnace, and the wet waste burns on the outside first, all odorous substances are decomposed and burned leaving no smell whatever.

As it is the organic matter of the wet waste which contains or decomposes into objectionable organic gases and as it is also the organic matter which harbors germs of disease and as I envelop such matter with the intense burning heat from an oxidizing flame, all germs are killed and all organic matter and gases which are decomposed and converted into inorganic matter and gases are not objectionable nor injurious to health. I so direct my flame as from a blow pipe that no germs, odors or gases from the wet waste can escape without passing through an intensely hot oxidizing flame. The heat scorches the outside and rapidly penetrates to the inside of the wet waste.

For the primary chamber or furnace, I use a fire box located below and away from the secondary furnace and I connect them by a relatively long primary flue near the base of which I prefer to have enter a number of air inlets or ducts whereby the flame and gases from the primary furnace before they enter the secondary furnace are charged with an excess of oxygen. The flues, chimney and furnaces of my device should be so proportioned that the very hottest part of the flame from the primary furnace will strike the wet waste in the secondary furnace.

My primary flue is preferably contracted toward its outlet and is so provided with adjustable air inlets that the flame passing through it becomes surcharged with air and leaves the flue like the blast from a blow pipe or from a gas torch at an intense heat. By contracting the flue, there is a tendency for the flame to contract therein and to expand when it enters the secondary furnace.

My invention covers the process of destroying and burning wet waste material by directing thereon in a suitable chamber an intensely hot flame charged with an excess of oxygen so as to envelop it; and the process of obtaining such flame from dry waste material.

My process is the subject of a separate application for patent which is a division hereof and is pending herewith. I prefer to use the devices illustrated and described herein for carrying out my invention.

If no dry waste material is available I can use coal, wood or liquid hydrocarbon fuel.

Figure 2:
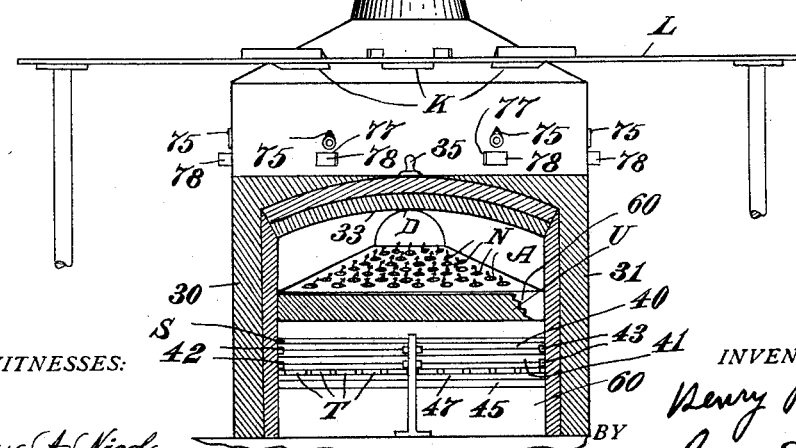
Figure 9:
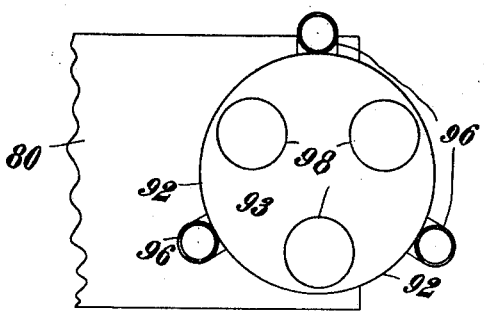
Figure 10:
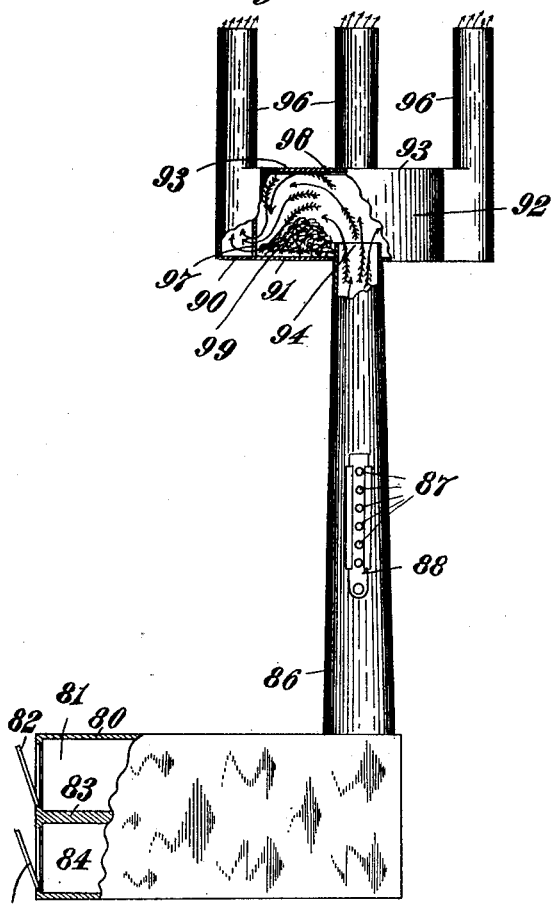

In the drawings, Figure 1 is a vertical sectional view from the side of an incinerator of my construction. Fig. 2 is a vertical sectional view from the front as on the line X—Y of Fig. 1. Fig. 3 is a front elevation and Fig. 4 is a plan view. Fig. 5 is a horizontal sectional view as on the line S—T of Fig. 1. Fig. 6 is a fragmentary elevation from the side and also shows part of the secondary furnace broken away. Fig. 7 is a perspective view of part of the grate bars of the primary furnace. Fig. 8 is a fragmentary vertical sectional section of a portion of the wall of the secondary furnace. Fig. 9 is a plan view and Fig. 10 is a side elevation with parts broken away of a modified construction.

The primary furnace of my preferred construction is of very simple construction comprising a chamber with an inclined front wall or apron at the top of which is an opening or door through which dry refuse can be pushed from the platform on which it is dumped. At the bottom of this incline is a special form of grate through which air can reach the fuel and which can be readily cleared of melted matter such as slag clinkers, tin cans, bottles, etc. To overcome the well known difficulty of burning packed paper and other similar material, I provide a series of stoke holes below the ordinary level of such fuel whereby it can be stirred up to permit the air to reach its different parts.

The whole device is made on the outside of ordinary red brick and on the inside of fire brick with substantially no metal parts on the inside except the grate of the primary furnace. On account of the intense heat, in a large furnace any metal part would soon be melted and rendered useless.

In the preferred construction shown in Figs. 1, 2, 3, 4, 5 and 6, A represents the fire box of the primary furnace and comprises side walls 30 and 31, a top wall 33, a back wall 60 and a front wall forming an apron U which slopes downward on an incline from the fuel feed opening P at the end of a platform V. The dry waste material or other fuel is dumped on platform V. The opening P preferably has a door 36. Near the bottom, front wall U is provided with a cleanout opening S. I prefer to place across this opening S two flat removable transverse bars 40 and 41 whose ends rest in brackets 42 and 43 at each side so that they can be removed at will leaving opening S entirely clear. These bars 40 and 41 are so shaped and placed, the lower in advance of the upper, that they extend the front wall U and thus catch any sawdust or like material which otherwise might fall out through the clean out opening S. The bottom of fire box A is open except for grate bars T which are preferably of metal and extend from back to front into opening S. They are supported by grate bar supports 45 which run crosswise into the side walls and have slots at the top through which bars T can slide. When slid out, they can rest on support 47 as shown by the dotted lines.

Grate bars T are preferably wide and flat and the spaces between them, which are determined by the slots in supports 45, are relatively very narrow, so that sawdust, excelsior and other small light material will not fall through so readily. I prefer also to provide a poker hole 34 in the top 33 whereby a poker can be introduced from the top when the cover 35 is removed to break up slag, clinkers, etc. By this construction one or more grate bars can be pulled out from the front from under any part of the fire desired and the clinkers which have been broken up from top poker hole 34 or otherwise can be thus dropped into the ash pit. Or one or more grate bars may be pulled out and the clinkers pushed through the opening thus made by a poker inserted through hole 34. By removing the clean out bars 40 and 41, the grate bars T can also be readily reached with a rake or clean out hoe and any non-inflammable material, clinkers, slag, melted bottles, etc., can be drawn out without interfering with the fire.

In the side walls of chamber A, I provide a series of lower stoke holes 11 which preferably have individual pivoted covers 51 and an upper series of stoke holes 10 with individual pivoted covers 52. Through these stoke holes, a poke can be introduced for the purpose of stoking, spreading and leveling the fuel and of stirring up the fire. Fire box A is extended in the form of a large relatively long primary flue C which is reduced in size as it extends away from A and is turned upward at D where it flares outward as it enters the secondary chamber E which serves as the fire box of the secondary furnace.

In the back wall 60 of the fire box or chamber A, and in the bottom wall 61 of flue C, I prefer to provide an inlet 12 with a cover 13 for a passage M which extends upward through wall 60 and through the bottom of flue C with which it communicates by means of a plurality of air inlets or ducts N which enter flue C. Thereby cold air from the outside passes in through passage M and becomes heated by the hot fire brick so that it enters flue C in a heated condition and supplies the flame with an excess of oxygen. I also prefer to provide an upper set of air inlets 54 which have sliding covers 55, in the side walls of the upper part of chamber A, whereby an excess of air may be gradually introduced or drawn in from that point and carried along by the draft with the flame becoming heated as it travels through flue C.

The second chamber E is preferably of substantially circular form in horizontal section with a domed ceiling 70. This ceiling 70 forms the interior of the top of chamber E and through this top are a plurality of wet waste feed openings K through which the garbage or other wet waste material to be consumed is dropped from where it is delivered on platform L.

As the top of secondary fire box E is of considerable thickness, I am enabled to use metal covers 37 for these wet waste feed openings K without the covers being melted by the intense heat, especially as they are placed near the outside of the chamber and out of direct line from flue outlet D. Moreover as the domed ceiling 70 deflects the sheaf of flame and the current of hot air from flue outlet D over and downward past the inner ends of the wet waste openings K at a distance from the covers thereof, they are kept relatively cool. This current sweeping past the inner ends of openings K also prevents any refuse from being blown or carried out through them.

Surrounding the outlet D of flue C is an annular ridge or sill 71 which serves to prevent the wet waste or the liquid portion thereof from running over into flue C. The vertical cylindrical walls R of chamber E have at their bottom a plurality of openings 72 which are continued upward as secondary flues H through walls R and over ceiling 70 through the top of the secondary chamber until they enter the base of a vertical smoke stack I. These flues are arranged at regular intervals and the wet waste openings K are located between them so that the piles of wet waste 20 will lie between the flues. It is manifest that the flame from primary flue C of primary chamber A will reverberate on ceiling 70 and will be directed with tremendous force and intense heat on the piles 20 so as to envelop them and will then escape through flues H into chimney I. The chimney I should preferably be of considerable height so that the draft will be sufficient.

The incline or apron U is especially built at such an angle that the dry refuse when it is pushed through the fuel door or opening P will roll over and over and will not pack together whereby the air will not be prevented from circulating through it and the gases generated therein by the heat are given a free outlet. The angle or slope of apron U is sufficiently flat so that the body of the material will partly rest thereon and will not drop in a solid mass onto the grate bars. As it burns at the bottom, it will gradually roll down aided by the stoking of the fire and by its own weight. By making this apron on a slope, the cleaning of the grate bars is also facilitated.

In the wall of the secondary furnace between the secondary flues H and opposite the piles of garbage, I build small openings or stoke holes 74 having suitable covers 75 through which a poker can be inserted for leveling and stirring up the wet waste so that the heat and flame can more readily reach it. These stoke holes 74 preferably have pivoted covers 75 in which are mica panes through which the interior of the furnace can be watched. I also provide clean out openings 77 having plugs 78 between the flues H on a level with the floor of the secondary furnace and adjoining the piles of wet waste whereby the ashes or burned residue may be raked out leaving the floor clear. It is desirable to keep the floor as clear as possible so that the porous brick of which it is preferably made will be heated to an intense heat with the result that when wet waste is dumped thereon, this hot floor assists very materially in rapidly expelling the moisture. In fact this floor becomes so hot that when moist garbage or waste material is dropped upon it, the moisture therein is flashed into steam and becomes immediately superheated by the intense heat of the chamber. As the openings of the secondary flues H are on a level with the material dumped thereon, the draft necessarily passes over and around this material whereby the hot blast completely envelops it in order to reach the flues.

The material 20 which is dumped into the secondary furnace as soon as it reaches the intensely hot floor is instantly subjected to such an intense heat from a flame which also carries an excess of oxygen that the moisture is almost instantly expelled and becomes superheated steam while any gases of disagreeable odor either unite with the oxygen and burn or are decomposed by the intense heat and become deodorized. In any event, they become inorganic and harmless.

If the ducts N do not furnish a sufficient excess of oxygen, the side openings 54 can be opened more or less thus admitting still more air at the pleasure of the operator. Or the passage M may be closed entirely and the excess of air admitted entirely through side openings 54. In either case, as the openings 54 and ducts N are placed along the course of the draft and as each admits a relatively small amount of air, the fire is not cooled off nor the draft checked. On the contrary, air is drawn in like it is in an injector and is mainly carried along on the outside of the flame until it strikes the wet waste in the secondary chamber where it is needed for combustion. If an excess of wet waste is dumped into the secondary furnace, the openings 54 can be opened while the draft is forced by clearing the grate bars, feeding heavily and stoking rapidly and using wood or coal fuel if necessary.

It will be observed that there are no openings through which cold air can be admitted to the reverberatory secondary furnace as the stoke holes 74 are very small and the wet waste openings K would be more likely to permit hot air to escape than cold air to enter. The clean out openings 77 are only opened for a very brief time. Moreover, the reverberatory ceiling and the course of the hot air prevents any cold air from entering. On this account, there is no cooling down of the incinerator at any time.

If it is not possible to secure a sufficient supply of dry waste material, I can use coal or wood in the primary furnace or by removing the transverse bars 40 and 41, I can introduce the nozzle of an oil burner.

One great advantage of my construction is, that the course of the draft is substantially direct and unobstructed. It is directed around the secondary furnace in such a way as to envelop the wet waste and to do its work thereon but without interfering with the general draft. As there are no metal ties to be heated there is no danger of expansion drawing the bricks out of true.

It is understood that I can use one or more primary furnaces leading into a single secondary furnace and that I can use my device for the destruction of garbage or of any wet waste material.

I show in Figs. 9 and 10 a simple modification of my construction which can be used for destroying some classes of waste material especially where it is to be done in small quantities. This form is adapted for use by private houses where a relatively small quantity of garbage and dry waste are made.

80 is a primary furnace which has a fire box 81 with a feed door 82, grate bars 83 and an ash pit 84 with an ash door 85. It may be of metal or any other suitable material.

The flue 86 from the primary furnace tapers toward the top and is provided with air holes 87 preferably covered with a slide 88 whereby an excess of air may be admitted and this flue 86 enters or passes through the floor 91 of the secondary furnace 90 which may be made of metal and has cylindrical walls 92 and a flat top 93. The flue 86 projects upward at 94 forming a protecting sill which prevents any liquid from running down into flue pipe 86.

A plurality of secondary flues 96 connect at their bottoms by openings 97 with the bottom of secondary furnace 90 whereby the flame and products of combustion must leave the secondary furnace at the bottom. A plurality of wet waste openings 98 are provided between the secondary flues.

The operation is the same as in the first described device. That is to say, the parts are so proportioned that the hottest part of the flame or blaze created in the primary furnace will strike the outside of the piles of wet waste 99 and envelop them thereby desiccating, decomposing and consuming it without giving any opportunity for objectionable gases, odors or germs to escape.

These are the most important features of my process and of the machines for carrying it out, as it is my purpose to carry the flame and heat from a primary furnace fed with an excess of air through a relatively long flue wherein thorough combustion takes place forming an intensely hot oxidizing flame which is conducted into a secondary furnace in such a manner that it will completely cover or envelop the refuse therein and will leave the secondary furnace through flues from the bottom thereof. The distance from the entrance to the exit should be relatively short and the secondary furnace should receive no air except the heated air which comes through the primary flue.

I do not intend to gradually dry out the wet waste but to subject it to an intense oxidizing flame whereby it is scorched and seared while the heat penetrates the mass and I so direct my flame that anything from the wet waste must pass through it thereby being rendered innocuous. In this way, I dispense with the use of the fire frequently used near the smoke stack of incinerators.

It is manifest that my primary furnace can be used for the destruction of dry waste whether or not there is any wet waste in the secondary furnace. It is also manifest that in such case, the secondary furnace can be dispensed with and the primary furnace used alone. Its peculiar advantages for burning dry waste material are the apron which leads downward from the feed opening, the removable clean out bars 40 and 41, the grate bars sliding in slots in their respective supports, the poker hole 34 through which the clinkers may be broken up, the two sets of stoke holes 10 and 11 with suitable covers which permit a poker to be inserted in the body of the fire, and the air inlets 54 arranged side by side in the direction of the draft and on each side of the primary fire box. This arrangement allows the dry waste to be fed along the apron U gradually, to spread it out through the side stoke holes, to break any molten material or clinkers through the top poker hole and to remove such material either through the clean out opening by removing the clean out bars 40 and 41 or by sliding out the grate bars a sufficient distance, while the side air inlets 54 give an excess of air above the fire whereby the smoke and gases are completely consumed.

What I claim as my invention and desire to cover by Letters Patent, is:

1. In an incinerator, the combination of a primary furnace having a feed opening and a grate, and a primary flue which extends from the primary furnace and into which enter ducts from the outside air, with a secondary furnace through the floor of which the said flue enters and having a domed ceiling, a plurality of secondary flues which extend at intervals from the bottom of the side walls of the secondary furnace and enter a stack, together with feed openings between the secondary flues as described.

2. In an incinerator, the combination of a primary furnace, and a primary flue which extends from the primary furnace, with a secondary furnace having a domed ceiling through the floor of which the said flue enters, and a plurality of secondary flues which extend at intervals from the bottom of the side wall of the secondary furnace, together with feed openings in the secondary furnace as described.

3. In an incinerator for waste material, a primary furnace having a feed opening, an inclined apron extending downward therefrom, and grate bars at the bottom thereof, together with a primary flue which extends from the primary furnace in a horizontal direction and is reduced in size as it extends and which terminates in a vertical flaring outlet, combined with a secondary furnace having a domed ceiling through the floor of which said outlet enters, a sill around said outlet, and flues which extend from the bottom of the vertical walls of the secondary furnace upward into a common stack, feed openings in the secondary furnace, and clean out openings in the secondary furnace as described.

4. In an incinerator for waste material, a primary furnace having a feed opening, an inclined apron which extends downward therefrom, and grate bars at the bottom of the apron, together with a primary flue which extends from the primary furnace in a horizontal direction and is reduced in size as it extends therefrom and which terminates in a vertical flaring outlet, and an air passage from the outside which connects by air ducts with the primary flue, combined with a secondary furnace having a domed ceiling through the floor of which said outlet enters, a sill around said outlet, and secondary flues which extend from the bottom of the vertical walls of the secondary furnace upward into a common stack, feed openings in the secondary furnace, and clean out openings in the secondary furnace as described.

5. In an incinerator for waste material, a primary furnace having a feed opening, an inclined apron which extends downward therefrom, and grate bars at the bottom of the apron, together with a primary flue which extends from the primary furnace in a horizontal direction and is reduced in size as it extends therefrom and which terminates in a vertical flaring outlet, and means for introducing heated air into said flue, combined with a secondary furnace having a domed ceiling through the floor of which said outlet enters, and flues which extend from the bottom of the vertical walls of the secondary furnace, feed openings in the secondary furnace, and clean out openings in the secondary furnace as described.

6. In an incinerator for waste material, a primary furnace having a feed opening, an inclined apron which extends downward therefrom, a clean out opening at the bottom of said apron, removable cross bars which extend across the clean out opening, transverse grate bar supports having grooves, and grate bars slidable out of the clean out opening and in such grooves, together with a relatively long primary flue which extends from the primary furnace in a horizontal direction and is reduced in size as it extends therefrom and terminates in a vertical flaring outlet, and means for introducing heated air into said flue, combined with a secondary furnace having a domed ceiling through the floor of which said outlet enters, a sill around said outlet, and flues which extend from the bottom of the vertical walls of the secondary furnace upward into a common stack, feed openings in the secondary furnace, and clean out openings in the secondary furnace as described.

7. In an incinerator for waste material, a primary furnace having a plurality of stoke holes on each side below the level of the fire, and having a feed opening, an inclined apron which extends downward therefrom, a clean out opening at the bottom of said apron, removable cross bars which extend across the clean out opening, transverse grate bar supports having grooves, and grate bars slidable out of the clean out opening and in such grooves, together with a relatively long primary flue which extends from the primary furnace in a horizontal direction and is reduced in size as it extends therefrom and terminates in a vertical flaring outlet, and an air passage from the outside which connects by air ducts with the primary flue, combined with a secondary furnace having a domed ceiling through the floor of which said outlet enters, a sill around said outlet, and flues which extend from the bottom of the vertical walls of the secondary furnace upward into a common stack, feed openings in the secondary furnace, stoke holes in the secondary furnace, and clean out openings in the secondary furnace as described.

8. In an incinerator for waste material, a primary furnace having a feed opening, an inclined apron extending downward therefrom and grate bars at the bottom thereof, together with a primary flue which extends from the primary furnace, combined with a secondary furnace having a domed ceiling through the floor of which said flue enters, and flues which extend from the bottom of the vertical walls of the secondary furnace upward into a common stack, feed openings in the secondary furnace, and clean out openings in the secondary furnace as described.

9. In an incinerator for waste material, a primary furnace having a feed opening, an inclined apron which extends downward therefrom, and grate bars at the bottom of the apron, together with a primary flue which extends from the primary furnace, and an air passage from the outside which connects by air ducts with the primary flue, combined with a secondary furnace having a domed ceiling through the floor of which said flue enters, a sill around said flue, and secondary flues which extend from the bottom of the vertical walls of the secondary furnace upward into a common stack, feed openings in the secondary furnace, and clean out openings in the secondary furnace as described.

10. In an incinerator for waste material, a primary furnace having a feed opening, an inclined apron which extends downward therefrom, and grate bars at the bottom of the apron, together with a primary flue which extends from the primary furnace, and means for introducing heated air into said flue, combined with a secondary furnace having a domed ceiling through the floor of which said flue enters, and secondary flues which extend from the bottom of the vertical walls of the secondary furnace, feed openings in the secondary furnace, and clean out openings in the secondary furnace as described.

11. In an incinerator for waste material, a primary furnace having a feed opening, an inclined apron extending downward therefrom and grate bars at the bottom thereof, together with a primary flue which extends from the primary furnace, combined with a secondary furnace having a ceiling through the floor of which said flue enters, and flues which extend from the bottom of the vertical walls of the secondary furnace upward into a common stack, feed openings in the secondary furnace, and clean out openings in the secondary furnace as described.

12. In an incinerator for waste material, a primary furnace having a feed opening, an inclined apron which extends downward therefrom, a clean out opening at the bottom of said apron, and grate bars which are individually removable at the bottom of said clean out opening, together with a relatively long primary flue which extends from the primary furnace, and means for introducing air into said flue, combined with a secondary furnace through the floor of which said primary flue enters, and flues which extend from the bottom of the vertical walls of the secondary furnace, feed openings in the secondary furnace, and clean out openings in the secondary furnace as described.

13. In an incinerator for waste material, a primary furnace adapted for burning dry waste, a relatively long flue which extends therefrom, and means for introducing air into said flue, combined with a secondary furnace having a ceiling and through the center of the floor of which said flue enters, secondary flues which extend from the bottom of the vertical walls of the secondary furnace, feed openings between the flues of the secondary furnace, and clean out openings in the secondary furnace as described.

14. In an incinerator, the combination of a primary furnace, with a primary flue which extends therefrom, means for admitting heated air into said flue, and a secondary furnace having a ceiling and through the center of the floor of which said primary flue enters, a plurality of secondary flues which extend at intervals from the bottom of the side wall of the secondary furnace, together with feed openings between the flues in the secondary furnace as described.

15. In an incinerator, the combination of a primary furnace, with a primary flue which extends therefrom and into which enter ducts from the outside air, and a secondary furnace having a ceiling and through the center of the floor of which said primary flue enters, a plurality of secondary flues which extend at intervals from the bottom of the side wall of the secondary furnace, together with feed openings between the flues in the secondary furnace, and clean out openings as described.

In testimony whereof I hereto affix my signature in presence of two witnesses.

HENRY RAGOT.

Witnesses:
HARRY R. LAWRENCE,
GARDNER W. PEARSON.